Patented Mar. 12, 1935

1,993,828

UNITED STATES PATENT OFFICE 1,993,828

SYNTHETIC RESIN

Merlin Martin Brubaker and George De Witt Graves, Wilmington, Del., assignors to E. I. du Pont de Nemours & Company, Wilmington, Del., a corporation of Delaware No Drawing. Application May 16, 1932, Serial No. 611,752

14 Claims. (Cl. 260—8)

This invention relates to synthetic resins and more particularly to improved resins of the polyhydric alcohol-polybasic acid type.

Polyhydric alcohol-polybasic acid resins, including their many modifications, are very useful in the coating composition art but possess a recognized disadvantage; viz., sensitivity to the action of water. By ordinary methods of preparation, a resin wherein complete esterification of the ingredients has taken place is rarely, if ever, obtained. Therefore, in the great majority of cases, these resins contain unesterified hydroxyl groups, particularly if secondary alcohol groups were present initially in the polyhydric alcohol, as is the case with glycerol. The poor water resistance of the resin can be ascribed, at least partially, to the presence of these unchanged hydroxyl groups. Among the methods suggested in the prior art for improving the water resistance of polyhydric alcohol-polybasic acid resins is the hardening of the resin by acylation with acetic acid vapors or acetic anhydride. These methods possess several disadvantages and the second mentioned method of acylation of preformed resins is especially disadvantageous because of the great difficulty encountered in removing acetic acid, which is formed as a by-product when the resin is treated with acetic anhydride.

This invention has as an object polyhydric alcohol-polybasic acid resins having improved water resistance. A further object is a process for increasing the water resistance of polyhydric alcohol-polybasic acid resins. Other objects will appear hereinafter.

These objects are accomplished by treating polyhydric alcohol-polybasic acid resins with ketenes. These substances are very reactive unsaturated organic compounds of the general formula

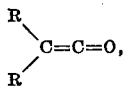

where R is hydrogen or a monovalent hydrocarbon radical. Examples of suitable ketenes are as follows:

| Common name | Formula |
| --- | --- |
| Ketene (carbo-methene) | $CH_2=C=O$ |
| Methyl ketene | $CH_3CH=C=O$ |
| Ethyl ketene | $C_2H_5CH=C=O$ |
| Stearyl ketene | $CH_3(CH_2)_{15}CH=C=O$ |
| Dimethyl ketene | $(CH_3)_2C=C=O$ |
| Diphenyl ketene | $(C_6H_5)_2C=C=O$ |
| Diphenylene ketene | $(C_6H_4)_2C=C=O$ |

In carrying out our invention, we prefer to dissolve the preformed resin in a suitable solvent and pass the ketene gas into the resin solution which is preferably maintained below 100° C. Aromatic ketenes, which are not readily vaporized, may be added in solid form to the resin solution, continuously or in small portions, but are preferably introduced in solution of ether, acetone, or other non-reactive solvent. This method is also frequently advantageous with the higher boiling aliphatic ketenes. The following examples, in which the parts are by weight, illustrate but do not limit the invention:

Example I

A resin is prepared by heating 29.7 parts of glycerol and 70.3 parts of phthalic anhydride for 4 hours at 200° C., or to an acid number of 120–130. This resin has unesterified hydroxyl groups and shows poor water resistance. A 50% solution of the resin in acetone is placed in a vessel fitted with a thermometer, stirrer, reflux condenser and an inlet tube which reaches below the surface of the liquid. Ketene ($CH_2=C=O$) is passed into this solution at room temperature. Absorption is rapid at first. An exothermic reaction takes place, the temperature rising to about 50° C. The introduction of the ketene is continued for 3–3½ hours or until the temperature falls below 30° C. The solids content drops to about 48%, probably due to the presence of acetone in the ketene. This product is slightly darker in color and has a somewhat higher acid number than the original material, but is more resistant to the action of water. In addition, the ketene-treated resin is compatible with nitrocellulose whereas the original resin is not. A mixture of equal parts of cyclohexanone and Cellosolve acetate is recommended as the solvent. Dimethyl ketene may be used instead of the ketene of the above example with essentially the same results.

Example II

A resin is prepared by heating 38.8 parts of glycerol with 61.2 parts of phthalic anhydride at 210° C. for 3 hours, or until an acid number of 35–40 is obtained. This resin is dissolved in an equal weight of acetone. Ketene is passed in until an exothermic reaction no longer takes place, this usually requiring 3–3½ hours. The solids content drops about 1%. Acid number determinations by the usual methods give unsatisfactory end-points, but this value is probably at 65–75. The ketene-treated resin is harder and more water-resistant than the original resin. The ketene-treated resin is compatible with nitrocellulose, clear films being deposited when Cellosolve acetate is used as the lacquer solvent. Clear films could not be obtained from the untreated resin and nitrocellulose under the same conditions. Similar results may be obtained by adding an ether-acetone solution of ethyl ketene to the above resin solution.

Example III

A resin is prepared by heating 22.7 parts of glycerol, 46.3 parts phthalic anhydride and 31.0 parts of linseed oil fatty acids for 6–7 hours at 200° C. or to an acid number of 45–50. Two parts of this resin is dissolved in 3 parts "Hi-flash" naphtha (the diethyl ether of glycol is also a good solvent) and ketene passed in for 1⅔ hours. The acid number rises to 66 and the color is slightly darker, but the ketene-treated product dries faster and is harder and more water-resistant than the original resin. It is soluble in the usual solvents and compatible with nitrocellulose.

The best results are usually obtained by passing the ketene into a solution in a non-reactive solvent of the preformed resin at temperatures of 25–50° C. However, it is possible to pass the ketene into the molten resin, during or after its formation. The higher temperatures, necessary for the latter variation, however, tend to polymerize the ketene before the proper reaction takes place. At times the ketene may be introduced under elevated pressures, this possibly being more advantageous in the latter stages. The ketene may also be admixed with an inert gas, as nitrogen or carbon dioxide; this frequently improves the color and offers a means of controlling the reaction more closely. Also, as previously pointed out, the high boiling or solid ketenes are preferably introduced in solution of ethers, ketones, hydrocarbons, or other non-reactive solvents.

As polybasic acids other than or in addition to phthalic acid mentioned in the examples, we may use one or more such acids as succinic, sebacic, fumaric, tartaric, citric, dilactylic, tricarballylic, salicyl-acetic, chlorophthalic, pyromellitic, naphthalic, hexahydrophthalic, diphenic and quinolinic.

Suitable polyhydric alcohols in addition to or instead of glycerol are ethylene glycol, butylene glycol, diethylene glycol, pentaerythritol, monoalkyl and aryl ethers of glycerol, etc.

Modifying agents that we have found to be most useful in the manufacture of our ketene treated resins are monobasic acids, monohydric alcohols and esters. A portion of the polybasic acid can be replaced by a chemically equivalent amount of such monobasic acids as butyric, oleic, stearic, lactic, benzoic, salicylic, abietic, China wood oil fatty acids, cottonseed oil fatty acids, etc. Natural resins, such as rosin, Kauri, and Congo, can be used. A portion of the polyhydric alcohol can be replaced by a chemically equivalent amount of such alcohols as butyl, lauryl, benzyl and cyclohexyl. Suitable modifying agents of the ester type are amyl acetate, dibutyl phthalate, tricresyl phosphate, olein, castor oil, linseed oil, coconut oil, soya bean oil, ethyl abietate, and ester gum. As a rule, no compensating change in the proportions of polyhydric alcohol and polybasic acid is made with ester modifying agents.

The methods conventionally used in making resins of the polyhydric alcohol-polybasic acid type may be used to prepare the resins to be treated with ketenes. For example, esterification catalysts such as sulfuric acid and sulfonic acids may be employed. Reduced or increased pressures are often advantageous. Auxiliary condensing systems, such as a short air-cooled reflux, are frequently advisable to offset the loss of the more volatile ingredients. Ester modifying agents, particularly the fatty oils and other glycerides, are preferably incorporated into resin by a preliminary heating with the polyhydric alcohol. The resinification can also be carried out in the presence of a non-reactive solvent, such as aromatic hydrocarbons, chlorobenzene, glycol diethyl ether, dichlorodiethyl ether, and in some cases aliphatic hydrocarbons and terpene solvents.

We desire it to be understood that the reference to ketene modified polyhydric alcohol-polybasic acid resins used in the claims means a resin which has been treated with a ketene as described herein and which is the reaction product of a polyhydric alcohol and a polybasic acid, with or without the presence of any of those ingredients known to be useful as modifying agents for polyhydric alcohol-polybasic acid resins.

My improved products are particularly useful as ingredients of coating compositions for wood, metal, etc. For this purpose, they may be used either alone or combined by mutual solvents, by heating, or by other means, with one or more of the following: cellulose derivatives, such as ethyl cellulose, nitrocellulose, cellulose acetate, benzyl cellulose, cellulose acetopropionate; natural gums, such as rosin, Kauri, and Damar; combined natural gums, as the ester gums and ethyl abietate; drying oils, such as linseed and China wood; other synthetic resins, as phenol-formaldehyde, amine-aldehyde, and vinyl; and bitumens, such as asphalts. To our products, either alone or combined with the above substances, we may add pigments, fillers, lakes, plasticizers, antioxidants, solvents, etc., as needed and desired. Any of the known methods of applying the finish such as spraying, brushing, baking, air-drying, etc., may be used.

The resins disclosed herein are also useful for many other purposes; plastic and molding compositions; cements; adhesives; binding agents for glass plates (safety glass), mica sheets (insulation), cellulose acetate (laminated products); and impregnating, coating and waterproofing agents for paper, fabrics, porous stone, and other bibulous materials.

From the foregoing it will be apparent that we have developed a new method of treating polyhydric alcohol-polybasic acid resins which offers many advantages. As compared to known methods of acetylation, the use of ketene is cleaner, quicker, forms no water as a by-product, eliminates the necessity of removing excess acetylating agent, and is more generally satisfactory. The water resistance of the resin is improved, probably because of the elimination of unesterified hydroxyl groups in the resin. The improvement in water resistance will be evident from the following comparison: Baked films of the resin of Example III before and after the ketene treatment were immersed side by side in water. The untreated resin begins to soften and whiten after about one hour. The film of the ketenized resin is not affected until the beginning of the fourth hour, when a slight softening starts; whitening does not appear until the beginning of the fifth hour. In addition to acetylation, the ketene exerts a desirable hardening action, due possibly to the simultaneous formation of ketene polymers. In many cases, particularly with unmodified polyhydric alcohol-polybasic acid condensation products, the resins are rendered compatible with cellulose derivatives, or, if already compatible, the range of compatibility is widened. Most drying oil modified resins are made faster-drying by treatment with ketene.

As many apparently widely different embodiments of this invention may be made without departing from the spirit and scope thereof, it is to be understood that we do not limit ourselves to the specific embodiments thereof except as defined in the following claims:

We claim:

1. A ketene modified polyhydric alcohol-polybasic acid resin.

2. A ketene modified glyceryl phthalate resin.

3. The product obtained by treating a polyhydric alcohol-polybasic acid resin with a ketene.

4. The product obtained by treating a polyhydric alcohol-polybasic acid resin with an organic compound of the general formula $$\begin{array}{c}R\\ \diagdown\\ C=C=O\\ \diagup\\ R\end{array}$$

where R is selected from the group consisting of hydrogen and hydrocarbon radicals.

5. A process which comprises treating a polyhydric alcohol-polybasic acid resin with a ketene.

6. A process which comprises treating a polyhydric alcohol-polybasic acid resin with an organic compound of the formula $$\begin{array}{c}R\\ \diagdown\\ C=C=O\\ \diagup\\ R\end{array}$$

where R is selected from the group consisting of hydrogen and hydrocarbon radicals.

7. A process which comprises treating a polyhydric alcohol-polybasic acid resin with carbomethene.

8. A process which comprises treating a glyceryl phthalate resin with a ketene.

9. A process which comprises treating a polyhydric alcohol-polybasic acid resin with a ketene, said resin comprising the reaction product of a polyhydric alcohol, a polybasic acid and a modifying agent selected from the group consisting of monobasic acids, monohydric alcohols, and esters.

10. A process which comprises passing a vaporized ketene into polyhydric alcohol-polybasic acid resin.

11. A process which comprises passing a vaporized ketene into a solution of polyhydric alcohol-polybasic acid resin.

12. A process which comprises treating a solution of a polyhydric alcohol-polybasic acid resin with a solution of a ketene.

13. A process which comprises forming a resin by reacting a polyhydric alcohol with a polybasic acid and treating the reaction mixture with ketene during formation of the resin.

14. A coating composition comprising a solution in an organic solvent of a polyhydric alcohol-polybasic acid resin modified by a ketene.

MERLIN MARTIN BRUBAKER.
GEORGE D. GRAVES.